United States Patent
Umemoto et al.

(10) Patent No.: US 6,255,242 B1
(45) Date of Patent: Jul. 3, 2001

(54) ZIRCONIUM- AND CERIUM-BASED MIXED OXIDE AND METHOD OF PRODUCTION THEREOF

(75) Inventors: Yoshichika Umemoto; Toshio Nakatani; Kimio Ouchi, all of Osaka (JP)

(73) Assignee: Daiichi Kigenso Kagaku Kogyo Co., Ltd., Osaka (JP)

(*) Notice: Subject to any disclaimer, the term of this patent is extended or adjusted under 35 U.S.C. 154(b) by 0 days.

(21) Appl. No.: 09/519,256

(22) Filed: Mar. 6, 2000

(30) Foreign Application Priority Data

Mar. 5, 1999 (JP) .................................. 11-057968

(51) Int. Cl.⁷ .................... C04B 35/48; C04B 35/488; C04B 35/50
(52) U.S. Cl. ............................... 501/103; 502/304
(58) Field of Search ............................. 502/304; 501/103

(56) References Cited

U.S. PATENT DOCUMENTS

| 4,927,799 | 5/1990 | Matsumoto et al. | 502/303 |
| 5,723,101 | * 3/1998 | Cuif | 423/592 |
| 5,747,401 | * 5/1998 | Cuif | 501/103 |
| 5,908,800 | * 6/1999 | Bonneau et al. | 501/103 |
| 5,945,369 | * 8/1999 | Kimura et al. | 502/304 |
| 5,958,827 | * 9/1999 | Suda et al. | 502/304 |

FOREIGN PATENT DOCUMENTS

| 0605274 | 7/1994 | (EP) . |
| 2736343 | 1/1997 | (FR) . |
| 2698302 | 1/1998 | (JP) . |
| WO 95/18068 | * 7/1995 | (WO) . |
| 9743214 | 11/1997 | (WO) . |
| 9845212 | 10/1998 | (WO) . |

OTHER PUBLICATIONS

Japanese Unexamined Patent Publication No. 58347 (1989), No month available.
Japanese Unexamined Patent Publication No. 116741 (1988), No month available.
Japanese Unexamined Patent Publication No. 168544 (1987), No month available.
Japanese Unexamined Patent Publication No. 281144 (1989), No month available.
Japanese Unexamined Patent Publication No. 284875 (1992), No month available.
Japanese Unexamined Patent Publication No. 55315 (1992), No month available.
Japanese Unexamined Patent Publication No. 286772 (1993), No month available.
Japanese Unexamined Patent Publication No. 278444 (1997), No month available.

* cited by examiner

Primary Examiner—Elizabeth D. Wood
(74) Attorney, Agent, or Firm—Baker Botts L.L.P.

(57) ABSTRACT

A zirconium- and cerium-based mixed oxide having good thermal stability and oxidation-reduction performance, in particular, is provided. The mixed oxide which comprises zirconium and cerium is characterized in (1) that cubic phase purity of a zirconia- and ceria-based solid solution is not less than 95% by volume of the crystal phase thereof and (2) that the cubic phase purity is not less than 75% by volume even after two repetitions of the step of subjecting the mixed oxide to heat treatment at 1,000° C. and then cooling the same to room temperature. A method of producing the mixed oxide is also provided which comprises admixing basic zirconium sulfate with a cerium ion-containing solution and then adding a base to the resulting mixed solution to thereby causing formation of a precipitate.

9 Claims, 6 Drawing Sheets

●-Example 1, ▲-Comparative Example 1, △-Comparative Example 2

ZIRCONIUM- AND CERIUM-BASED MIXED OXIDE AND METHOD OF PRODUCTION THEREOF

FIELD OF THE INVENTION

The present invention relates to a novel zirconium- and cerium-based mixed oxide and to a method of producing the same. The invention further relates to a catalyst material for exhaust gas purification which comprises the oxide.

BACKGROUND OF THE INVENTION

Cerium oxide, which has oxidation-reduction performance, is used for improving the catalytic activity of three-way catalysts comprising at least one platinum group element such as platinum, rhodium or palladium and capable of simultaneously eliminating hydrocarbons(HC), carbon monoxide(CO) and nitrogen oxides(NOx) in the exhaust gas discharged from internal-combustion engines of automobiles, among others.

It is known, however, that catalysts comprising a platinum element and cerium oxide undergo marked reduction in oxidation-reduction performance of cerium oxide and the performance as catalysts readily deteriorate at high temperatures above 800° C.

For maintaining the oxidation-reduction performance of cerium oxide at high temperatures, methods have been proposed which comprise adding an oxide of a rare earth metal other than cerium and/or zirconium oxide to thereby suppress the crystallization of cerium oxide (e.g. Japanese Unexamined patent Publication Nos.58347/1989, 116741/1988). Methods comprising preparing a mixed oxide comprising cerium oxide and zirconium oxide in advance and using the same (e.g. Japanese Unexamined Patent Publication Nos.168544/1987, 281144/1989, 284875/1992).

Further, for increasing the function as a promoter or support(carrier) of a catalyst for exhaust gas purification, methods of improving the thermal stability of specific surface area and the oxidation-reduction performance of a mixed oxide comprising cerium oxide and zirconium oxide have also been disclosed (e.g. Japanese Unexamined Patent Publication Nos.55315/1992, 286772/1993, 278444/1997, and Japanese Patent No.2698302). Today, when advanced measures are being taken to protect the earth environment, the durability temperature with respect to the thermal stability of specific surface area and the deterioration in oxidation-reduction performance of a promoter or catalyst carrier amounts to about 1,000° C. as a result of efforts toward improvements in response to more and more tightened regulations.

With such conventional cerium oxide-zirconium oxide mixed oxides, however, the thermal stability of specific surface area is such that the specific surface area after heat treatment at 1,000° C. is about 20 m²/g, and the oxidation-reduction performance is such that even those mixed oxides which have not yet been subjected to heat treatment have an oxygen storage capacity of about 0.1 mmol $O_2$/g.

Under certain conditions of driving of automobiles (e.g. 10-mode test(emission test mode)in Japan), the majority of the total emission of unoxidized hydrocarbons is emitted at temperatures lower than the temperature at which the catalyst begins to function. This temperature at which the catalyst begins to function is called $T_{50}$ (temperature at which 50% of the maximum exhaust gas purification is attained). An attempt has been made to shorten the time required to heat the catalyst by disposing the catalyst in a position close to the engine. According to this measure, the durability temperature required of the catalyst exceeds 1,000° C. and, in addition, the catalyst is exposed to repeated heating cycles comprising rapid heating and cooling to room temperature. Therefore, it is necessary to develop a novel catalyst material capable of satisfying such requirements.

On the other hand, a generally known method of producing cerium oxide and zirconium oxide in the form of a homogeneously united form comprises adding a base to a cerium ion- and zirconium ion-containing aqueous solution and recovering the resulting mixed salt precipitate (Japanese Unexamined Patent Publication No.278444/1997).

However, since the mixed salt precipitate formed by the above method is a gel-like bulky hydroxide precipitate with a high water content, an extra step of filtration or solid-liquid separation is required for removing impurities. Therefore, the rate of treatment per run is necessarily reduced and, furthermore, an immense quantity of heat energy is required for thermal conversion to oxides. Thus, the conventional method of production cannot be said to be adequate for industrial scale production.

SUMMARY OF THE INVENTION

The present invention, which has been made in view of such problems of the prior art as mentioned above, has a primary object to provide a zirconium- and cerium-based mixed oxide having good thermal stability and oxidation-reduction performance, in particular.

As a result of intensive investigations made by the present inventors, it was found that the mixed oxide obtained by a specific production method has particular characteristics. Based on such and other findings, the present invention has at last been completed.

The present invention is thus concerned with a zirconium- and cerium-based mixed oxide defined below and a method of producing the same as defined below.

1. A zirconium- and cerium-based mixed oxide comprising zirconium and cerium, characterized in (1) that cubic phase purity of a zirconia- and ceria-based solid solution is not less than 95% by volume of the crystal phase thereof and (2) that the cubic phase purity is not less than 75% by volume even after two repetitions of the step of subjecting the mixed oxide to heat treatment at 1,000° C. and then cooling the same to room temperature (first aspect of the invention).

2. A zirconium- and cerium-based mixed oxide comprising zirconium and cerium, characterized in (1) that it has an initial oxygen storage capacity of not less than 800 $\mu$mol $O_2$/g $CeO_2$ and (2) that it has an oxygen storage capacity of not less than 70% of the initial oxygen storage capacity even after two repetitions of the step of subjecting the mixed oxide to heat treatment at 1,000° C. and then cooling the same to room temperature (second aspect of the invention).

3. A method of producing zirconium- and cerium-based mixed oxides which comprises admixing basic zirconium sulfate with a cerium ion-containing solution and then adding a base to the resulting mixed solution to thereby cause formation of a precipitate.

The present invention is further concerned with a catalyst material for exhaust gas purification which comprises the zirconium- and cerium-based mixed oxide as defined above under 1 and 2.

DETAILED DESCRIPTION OF THE INVENTION

Figure 1:
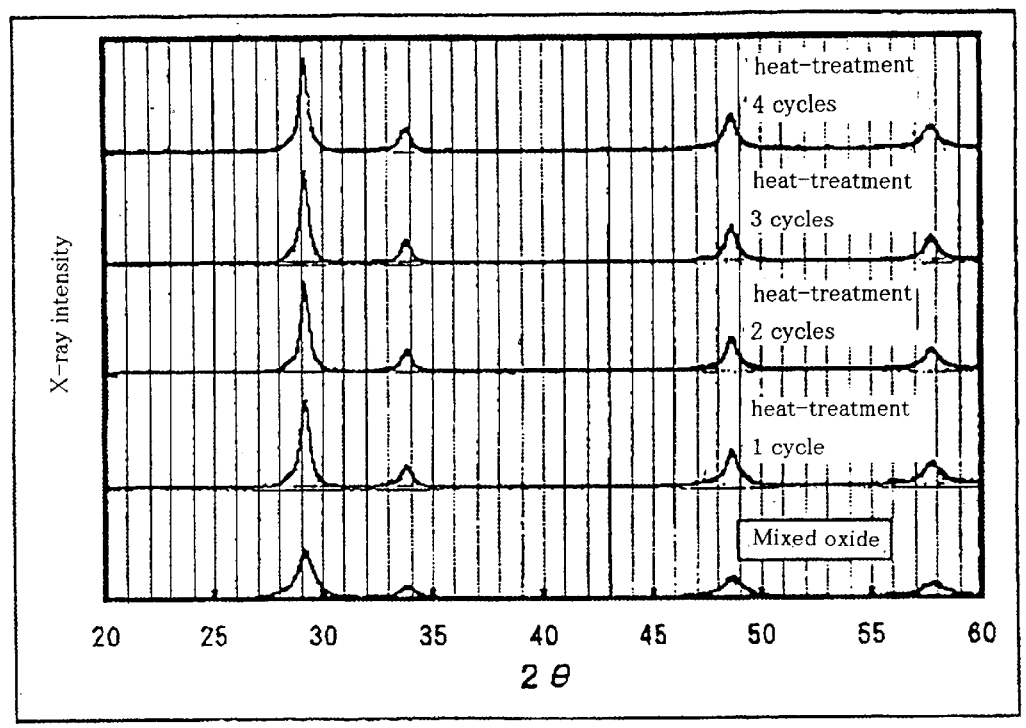
FIG. 1 shows the results of an X ray diffraction analysis of the mixed oxide of Example 1 before and after heat treatment cycle testing.

The zirconium- and cerium-based mixed oxide according to the first aspect of the invention is a mixed oxide comprising zirconium and cerium which is characterized in (1) that cubic phase purity of a zirconia- and ceria-based solid solution is not less than 95% by volume of the crystal phase thereof and (2) that the cubic phase purity is not less than 75% by volume even after at least two (in particular three or more) repetitions of the step of subjecting the mixed oxide to heat treatment at 1,000° C. and then cooling the same to room temperature.

In the above oxide, cubic phase purity(an amount of a cubic phase) of a zirconia- and ceria-based solid solution is not less than 95% by volume, preferably not less than 99% by volume of the crystal phase of the mixed oxide. By securing the above proportion of the cubic phase purity at a level not lower than 95% by volume, it is possible for the above mixed oxide to exhibit good performance as a catalyst material, among others.

In addition, even after at least two repetitions of the step of subjecting the mixed oxide to heat(thermal) treatment at 1,000° C. and then cooling the same to room temperature, the above purity(content) of the cubic phase is not less than 75% by volume, preferably not less than 80% by volume. Therefore, for example, any mixed oxide having the cubic phase purity within the above range after two repetitions of the above step falls under the scope of the present invention.

Specifically, in the above step, 5 grams of the mixed oxide is placed in a crucible and subjected to 3 hours of heat treatment at 1,000° C. in an oxidizing atmosphere in an electric furnace heated to 1,000° C. in advance, and the crucible is then taken out of the electric furnace and allowed to cool to room temperature (about 18° C.) in a desiccator. This heating and cooling cycle is repeated at least two times (the same shall apply to the second aspect of the invention and to the examples described later herein).

The zirconium- and cerium-based mixed oxide according to the second aspect of the invention is a mixed oxide comprising zirconium and cerium which is characterized in (1) that it has an initial oxygen storage capacity of not less than 800 $\mu$mol-$O_2$/g-$CeO_2$ and (2) that it has an oxygen storage capacity of not less than 70% of the initial oxygen storage capacity even after at least two (in particular three or more) repetitions of the step of subjecting the mixed oxide to heat treatment at 1,000° C. and then cooling the same to room temperature.

The initial oxygen storage capacity is not less than 800 $\mu$mol $O_2$/g $CeO_2$, preferably not less than 1,000 $\mu$mol $O_2$/g $CeO_2$.

In addition, even after at least two repetitions of the step of subjecting the above mixed oxide to heat treatment at 1,000° C. and then cooling the same to room temperature, the mixed oxide has an oxygen storage capacity of not less than 70%, preferably not less than 80%, of the initial oxygen storage capacity. Thus, in accordance with the second aspect of the invention, the percent deterioration in oxygen storage capacity is preferably less than 30%.

In accordance with the second aspect of the invention, it is preferred that the requirements according to the first aspect of the invention be simultaneously satisfied. Thus, it is preferred (1) that cubic phase purity of a zirconia- and ceria-based solid solution is not less than 95% by volume of the crystal phase of the mixed oxide and (2) that the cubic phase purity is not less than 75% by volume even after at least two (in particular three or more) repetitions of the step of subjecting the mixed oxide to heat treatment at 1,000° C. and then cooling the same to room temperature.

In accordance with the first and second aspects of the invention (hereinafter collectively referred to as "present invention"), it is further preferred that the specific surface are (determined by the BET method) of the mixed oxide after heat treatment at 1,100° C. be not less than 10 m²/g, in particular not less than 20 m²/g. In particular, it is preferred that the specific surface area after 3 hours of heat treatment at 1,100° C. be not less than the above value.

In the practice of the present invention, the percent composition can adequately be selected according to the intended use of the final product. Generally, it is recommended that zirconium oxide accounts for 30 to 90% by weight and cerium oxide for 10 to 70% by weight, preferably that zirconium oxide accounts for 40 to 70% by weight and cerium oxide for 30 to 60% by weight.

In the practice of the present invention, the mixed oxide may contain another metal or metals (third metal(s)) as occasion demands. As such, there may be mentioned, among others, rare earth metals such as scandium, yttrium, lanthanum, praseodymium, neodymium, samarium, europium, gadolinium, terbium, dysprosium, holmium, erbium, thulium, ytterbium and lutetium, as well as titanium, hafnium, vanadium, chromium, manganese, iron, cobalt, nickel, copper, zinc, molybdenum, tungsten, indium, tin, antimony and phosphorus. These may be used singly or in admixture of two or more of them. In the practice of the invention, the use, among them, of at least one member of the group consisting of rare earth metals (excluding cerium), titanium and hafnium is preferred. In that case, it is more preferred that the mixed oxide may contain at least one of lanthanum, praseodymium and neodymium. By adding such a third metal, it is possible to still more improve with certainty the controllability of crystal phase formation and the heat cycle stability of the oxidation-reduction performance.

The content of such a third metal can adequately be selected according to the third metal species, the use of the final product and other factors. Generally, however, it is recommended that the content as oxide in the mixed oxide be not higher than 30% by weight, preferably 1 to 15% by weight, more preferably 5 to 14% by weight.

In accordance with the present invention, the mixed oxide may further contain sulfur in the form of sulfate ($SO_4$). By this, the oxidation-reduction performance, in particular, can be still more improved. The content of this sulfate may adequately be varied according to the composition of the mixed oxide, the use of the final product and other factors. Generally, it is recommended that the content be not more than 3% by weight, preferably 0.05 to 1.5% by weight.

The mixed oxide of the present invention can be produced, for example, by admixing basic zirconium sulfate with a cerium ion-containing solution and then adding a base to the resulting mixture to thereby cause formation of a precipitate.

The basic zirconium sulfate is not particularly restricted but includes such compounds as $ZrOSO_4 \cdot ZrO_2$, $5ZrO_2 \cdot 3SO_3$ and $7ZrO_2 \cdot 3SO_3$ in hydrate form. These may be used either singly or in combination of two or more.

Generally, these basic salts are obtained as aggregate particles having a size of 0.1 to ten-odd micrometers as resulting from aggregation of microfine particles of a size of several tens of angstroms as determined optically and having a low solubility, and the products obtained by a known method as well as the commercial products can be used. For example, those described in "Gmelins Handbuch, Teil 42: Zirkonium (ISBN 3-540-93242-9, 334–353, 1958)", among others, can be used.

The cerium ion-containing solution is not particularly restricted provided that the cerium ion or ions (generally representable by $Ce^{3+}$ and/or $Ce^{4+}$) can exist stably therein. For example, a solution prepared by dissolving a cerium salt in an appropriate solvent can be used. Usable as the cerium salt are inorganic acid salts, such as nitrate, sulfate and chloride, of cerium, and organic salts, such as acetate and oxalate, of cerium. More specifically, there may be mentioned cerium(III) nitrate, cerium(IV) nitrate, cerium (III) chloride, cerium (IV) sulfate and cerium(III) ammonium nitrate, among others.

The solvent to be used is not particularly restricted provided that a cerium salt and a zirconium salt, among others are soluble therein. Generally, water, alcohols (e.g. methanol, ethanol) and the like can be used. The concentration of the solution may be varied according to the percent composition of the mixed oxide and other factors but it is generally recommended that the concentration be about 1 to 25% by weight, preferably 10 to 20% by weight.

In cases where a third metal is caused to be contained in the mixed oxide, the corresponding metal in ionized form is caused to be contained in the mixed solution. For example, a compound containing the third metal (for example, an inorganic acid salt, such as sulfate, nitrate or chloride, or an organic acid salt, such as acetate or oxalate, of the third metal) as such is incorporated into the cerium ion-containing solution or in the mixed solution, or a solution of the above compound is prepared in advance and this solution is incorporated into the above-mentioned cerium ion-containing solution or mixed solution or basic zirconium sulfate.

For further causing sulfate to be contained in the mixed oxide, it suffices to add a sulfate ion-containing solution or causing the sulfate ion of the basic zirconium sulfate to be retained. In the case of addition of a sulfate ion-containing solution, a sulfate ion-containing compound (e.g. sulfuric acid or a sulfate salt such as ammonium sulfate, sodium sulfate, potassium sulfate or aluminum sulfate) may be added to the solution mentioned above, or a solution of the additive component may be prepared beforehand and added to the solution mentioned above or to the basic zirconium sulfate. As for the method of causing the sulfate ion of the basic zirconium sulfate to be retained, a base, for instance, is added to thereby vary and control the pH on the occasion of hydroxide formation so as to prevent the sulfate ion from being eliminated.

The mixing ratio between basic zirconium sulfate and the cerium ion-containing solution can be selected by adequately adjusting the concentration of the solution, for instance, so as to give the percent composition mentioned above. It is generally recommended that the temperature of the mixed solution be not higher than 80° C., preferably 20 to 50° C.

Then, after admixing of basic zirconium sulfate with the cerium ion-containing solution, a base is added to the mixed solution to cause formation of a precipitate.

The base is not particularly restricted but a known alkaline agent such as sodium hydroxide, potassium hydroxide, sodium carbonate, ammonium carbonate or ammonia may be used. In the practice of the present invention, the use of a strong alkali such as sodium hydroxide or potassium hydroxide is particularly preferred. These bases are preferably added in the form of an aqueous solution. In that case, the concentration of the aqueous solution is not particularly restricted provided that pH adjustment is possible. It is generally recommended that the concentration of the aqueous solution be about 5 to 50% by weight, preferably 20 to 25% by weight.

In the practice of the present invention, the content of sulfate in the mixed oxide, in particular, can be controlled by varying the level of addition of the base (namely pH). Generally, it is recommended that the pH of the mixed solution be not less than 12 but less than 14. The level of addition of the base may be selected within the above range according to the desired content of sulfate.

The precipitate formed can be recovered by filtration and washing with water according to a known recovering method employed in coprecipitation processes, followed by application of a known solid-liquid separation technique. The precipitate recovered may be dried when necessary. The drying may be effected by means of air or with heating.

In the practice of the invention, the precipitate may be fired(heated) if need be. The firing conditions are not particularly restricted. Generally, however, the firing may be performed in an oxidizing atmosphere or in the air at a temperature not lower than 400° C. So long as the desired mixed oxide is obtained, the upper limit to the firing temperature is not particularly restricted. The firing time may be selected according to the firing temperature and other factors. A period of about 1 to 8 hours after arrival of the temperature of the material to be fired at the predetermined temperature is sufficient. After firing, the product may be subjected to grinding treatment, classification treatment and so forth, as occasion demands.

The catalyst material(catalyst, promoter or co-catalyst, support or carrier, etc.) for exhaust gas purification according to the present invention comprises the zirconium- and cerium-based mixed oxide of the present invention. It is particularly useful as a promoter or co-catalyst assisting a noble metal (e.g. platinum, rhodium, palladium, iridium) which is the active component for exhaust gas purification, as disposed directly below an engine, to function. The above material can also judiciously be used as an OSC (oxygen storage component) construct to cope with the monitoring requirement under the OBD-II regulation.

In the production process of the present invention, when a base is added to a mixed solution containing basic zirconium sulfate and cerium in ionized form, the neutralization reaction between the sulfate ion in the basic zirconium sulfate and the hydroxide ion($OH^-$) supplied by the base and the neutralization reaction between the cerium ion and hydroxide ion proceed simultaneously.

On that occasion, the cerium ion is selectively located in the vicinity of the sulfate site of the basic zirconium sulfate owing to its chemical affinity for the sulfate ion and converted to the hydroxide form even on the surface of the basic zirconium sulfate (or zirconium hydroxide depending on the extent of progress of the neutralization reaction). This phenomenon generally conforms to the principle of post-precipitation or coprecipitation.

Utilizing the above characteristic reaction, the present invention makes it possible to efficiently obtain a precipitate with zirconium and cerium uniformly brought together therein. In the above reaction process, the sulfate ion contained in the basic zirconium sulfate, after leaving zirconium, once forms an intermediate with the cerium ion (or cerium hydroxide) by chemical bonding (or chemisorption) due to the difference in chemical affinity for the sulfate ion between zirconium and cerium. This phenomenon becomes evident from the fact that the content of sulfate sulfur in the mixed oxide is greatly influenced not by the thermal stability of the specific surface area due to zirconium oxide but by the oxidation-reduction performance due to cerium oxide.

The production method of the invention, which uses basic zirconium sulfate, in particular, as the zirconium precursor, can give a zirconium- and cerium-based mixed oxide having high chemical homogeneity with good reproducibility and high efficiency, hence is suited for industrial scale production.

The zirconium- and cerium-based mixed oxide of the present invention has a structure high in chemical uniformity and therefore has good thermal stability and oxidation-reduction performance. Therefore, it can maintain its good thermal stability and oxidation-reduction performance against heating-cooling cycles.

Therefore, when the above mixed oxide is used as a catalyst material for exhaust gas purification for internal-combustion engines, the crystal structure hardly undergoes changes even when it is exposed to heating-cooling cycles due to stop, start, acceleration and stop of the engines. Thus, good oxidation-reduction performance can stably be obtained.

EXAMPLES

The following examples and comparative examples illustrate the present invention in further detail. These examples are, however, by no means limitative of the scope of the present invention.

The physical characteristics were measured by the methods described below. The zirconium used in the examples contained hafnium (1.3 to 2.5% by weight as hafnium oxide) as an inevitable impurity.

(1) Percentage composition of mixed oxide

The composition was determined by ICP (inductively coupled plasma) emission spectroscopic analysis.

(2) Oxygen storage capacity

The oxygen storage capacity was measured by the oxygen pulse method at 600° C. using the apparatus "Multitask TPD (TPD-1-AT) (product of Bell Japan).

(3) Deterioration in oxygen storage capacity (OSC)

The percent deterioration was calculated by dividing the difference between the initial oxygen storage capacity ($OSC_0$) and the oxygen storage capacity ($OSC_2$) after two repeated heating-cooling cycles by the initial oxygen storage capacity of the mixed oxide, as shown below:

$$OSC\ (\%) = [(OSC_0 - OSC_2)/OSC_0] \times 100$$

(4) Cubic phase purity in crystal phase

The cubic phase purity was determined by dividing the intensity (Ia) of the crystal face (111) of cubic phase of the mixed oxide by the sum (Ia+Ib) of the intensities of the crystal face of cubic phase of the mixed oxide and of cubic phase of pure cerium oxide as a single component, as shown below. Each intensity value was determined using the apparatus "GeigerFlex RAD-2C" (product of Rigaku Corp.).

Cubic phase purity (% by volume)=[Ia/(Ia+Ib)]×100

(5) Sulfate content

The sulfate content was determined by the plasma combustion-infrared absorption method using the apparatus "HORIBA EMIA-520" (product of Horiba Seisakusho).

Example 1

Basic zirconium sulfate (containing 86 g as zirconium oxide) was dispersed in 1,000 g of water and, further, an aqueous solution of cerium nitrate (containing 88 g as cerium oxide), an aqueous solution of lanthanum nitrate (containing 18 g as lanthanum oxide) and an aqueous solution of praseodymium nitrate (containing 8 g as praseodymium oxide) were added to the dispersion, to give a mixed solution.

Then, a 25% (by weight) aqueous solution of sodium hydroxide was added to the above mixture until the pH of the mixed solution arrived at 13.5 to give a precipitate. The precipitate was recovered by solid-liquid separation and the solids were heated at 660° C. in the air for 3 hours.

The crystal phase of the mixed oxide obtained was composed of a cubic phase, and the initial oxygen storage capacity thereof was 412 $\mu$mol-$O_2$/g (940 $\mu$mol-$O_2$/g-$CeO_2$). The percentage composition was as follows: 42.9% by weight of zirconium oxide, 43.8% by weight cerium oxide, 9.1% by weight of lanthanum oxide and 4.1% by weight of praseodymium oxide. The sulfate content was 0.1% by weight. After heating-cooling cycles, the cubic phase purity was 100% by volume and the deterioration in oxygen storage capacity was 7%. After 3 hours of heat treatment at 1,100° C., the BET specific surface area was 22 $m^2$/g and the oxygen storage capacity was 840 $\mu$mol-$O_2$/g-$CeO_2$.

Examples 2 to 5

Using basic zirconium sulfate, an aqueous solution of cerium nitrate, an aqueous solution of lanthanum nitrate and praseodymium nitrate in the proportions shown in Table 1, mixed oxides were produced in the same manner as in Example 1. The mixed oxides obtained each had cubic phase purity of not lower than 95% by volume.

The percent composition, sulfate content, initial oxygen storage capacity, cubic phase purity and deterioration in oxygen storage capacity of each mixed oxide after heating-cooling cycles, and oxygen storage capacity and BET specific surface area of each mixed oxide after 3 hours of heat treatment at 1,100° C. as found are shown in Table 2.

TABLE 1

|  | Example 2 | Example 3 | Example 4 | Example 5 |
|---|---|---|---|---|
| Basic zirconium sulfate | 120 g | 120 g | 104 g | 144 g |
| Aqueous solution of cerium nitrate | 60 g | 60 g | 72 g | 42 g |
| Aqueous solution of lanthanum nitrate | 20 g | 10 g | 16 g | 4 g |

TABLE 1-continued

|  | Example 2 | Example 3 | Example 4 | Example 5 |
|---|---|---|---|---|
| Aqueous solution of praseodymium nitrate | — | 10 g | 8 g | — |
| Aqueous solution of neodymium nitrate | — | — | — | 10 g |

TABLE 2

|  | Example 2 | Example 3 | Example 4 | Example 5 |
|---|---|---|---|---|
| zirconium oxide (%) | 60.1 | 59.8 | 52.0 | 71.8 |
| cerium oxide (%) | 29.8 | 29.8 | 36.0 | 21.2 |
| lanthanum oxide (%) | 9.6 | 4.8 | 8.0 | 1.9 |
| praseodymium oxide (%) | — | 4.9 | 3.8 | — |
| neodymium oxide (%) | — | — | — | 5.1 |
| sulfate (%) | 0.5 | 0.7 | 0.2 | 0.05 |
| Initial oxgen storage capacity ($\mu$mol-$O_2$/g) | 358 | 321 | 362 | 254 |
| Initial oxgen storage capacity ($\mu$mol-$O_2$/g-$CeO_2$) | 1201 | 1077 | 1006 | 1198 |
| Deterioration in oxgen storage capacity (%) | 10 | 12 | 10 | 10 |
| Cubic phase purity (%) | 88 | 85 | 92 | 99 |
| Oxgen storage capacity (1100° C.) ($\mu$mol-$O_2$/g-$CeO_2$) | 1040 | 734 | 878 | 1052 |
| Specific surface area(1100° C.) ($m^2$/g) | 24 | 21 | 15 | 28 |

Comparative Example 1

A mixed solution was prepared by adding an aqueous solution of cerium nitrate (containing 74 g as cerium oxide) and an aqueous solution of lanthanum nitrate (containing 2 g as lanthanum oxide) to an aqueous solution of zirconium nitrate (containing 24 g as zirconium oxide), and 2 g of ammonium sulfate was further added. To this mixture was added a 25% (by weight) aqueous solution of ammonia until the pH reached 10.2 to thereby cause formation of a precipitate. The resulting precipitate was recovered by solid-liquid separation and the solids obtained were fired in the air at 660° C. for 3 hours. The solids obtained comprised two different cubic phases, namely a cubic phase of a mixed oxide and a cubic phase of a cerium oxide. The solids obtained were examined for characteristics in the same manner as in Example 1. The results obtained are shown in Table 3.

Comparative Example 2

A mixed solution was prepared by adding an aqueous solution of cerium nitrate (containing 116 g as cerium oxide) to an aqueous solution of zirconium hydroxide (containing 84 g as zirconium oxide). To the mixed solution was added an 25% (by weight) aqueous solution of ammonia to make the pH 10.2, to give a precipitate. The precipitate was recovered by solid-liquid separation and the solids obtained were fired at 660° C. in the air for 3 hours. The solids comprised two different cubic phases. The solids were examined for characteristics in the same manner as in Example 1. The results are shown in Table 3.

TABLE 3

|  | Comparative Example 1 | Comparative Example 2 |
|---|---|---|
| zirconium oxide(%) | 23.8 | 42.1 |
| cerium oxide (%) | 73.2 | 57.9 |
| lanthanum oxide (%) | 2.0 | — |
| praseodymium oxide (%) | — | — |
| neodymium oxide (%) | — | — |
| sulfate (%) | 1.0 | — |
| Initial oxgen storage capacity ($\mu$mol-$O_2$/g) | 467 | 474 |
| Initial oxgen storage capacity ($\mu$mol-$O_2$/g-$CeO2$) | 632 | 817 |
| Deterioration in oxgen storage capacity (%) | 61 | 42 |
| Cubic phase purity (%) | 20 | 59 |
| Oxgen storage capacity (1100° C.) ($\mu$mol-$O_2$/g-$CeO_2$) | 175 | 355 |
| Specific surface area (1100° C.) ($m^2$/g) | 6 | 8 |

Test Example 1

Figure 2:
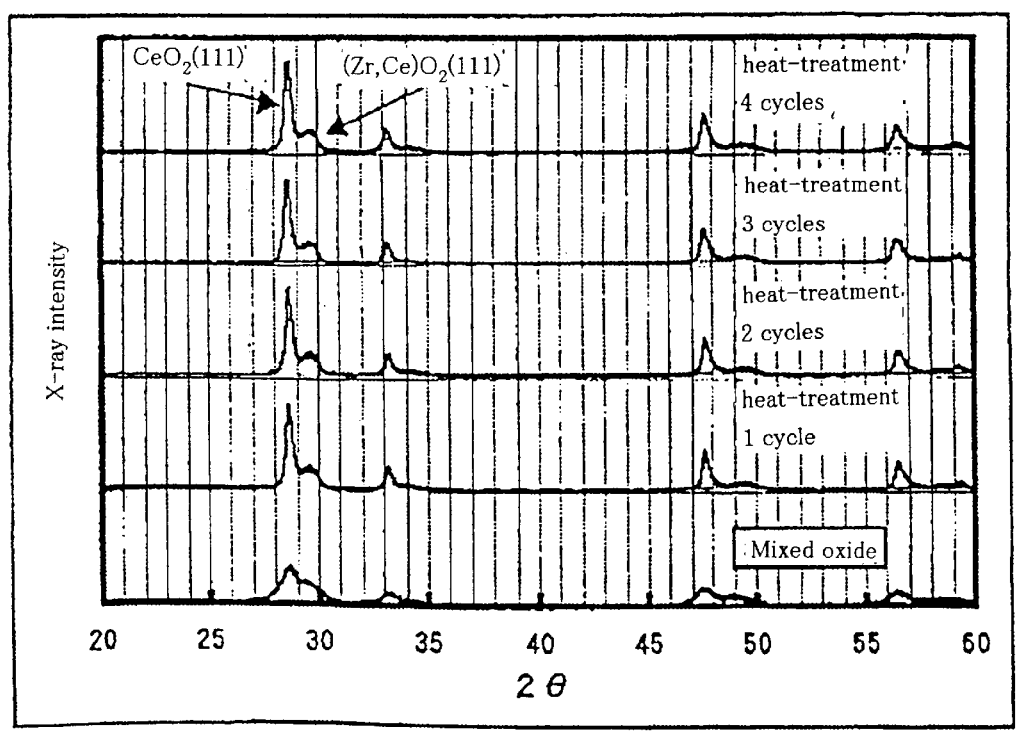
FIG. 2 shows the results of an X ray diffraction analysis of the mixed oxide of Comparative Example 1 before and after heat treatment cycle testing.
Figure 3:
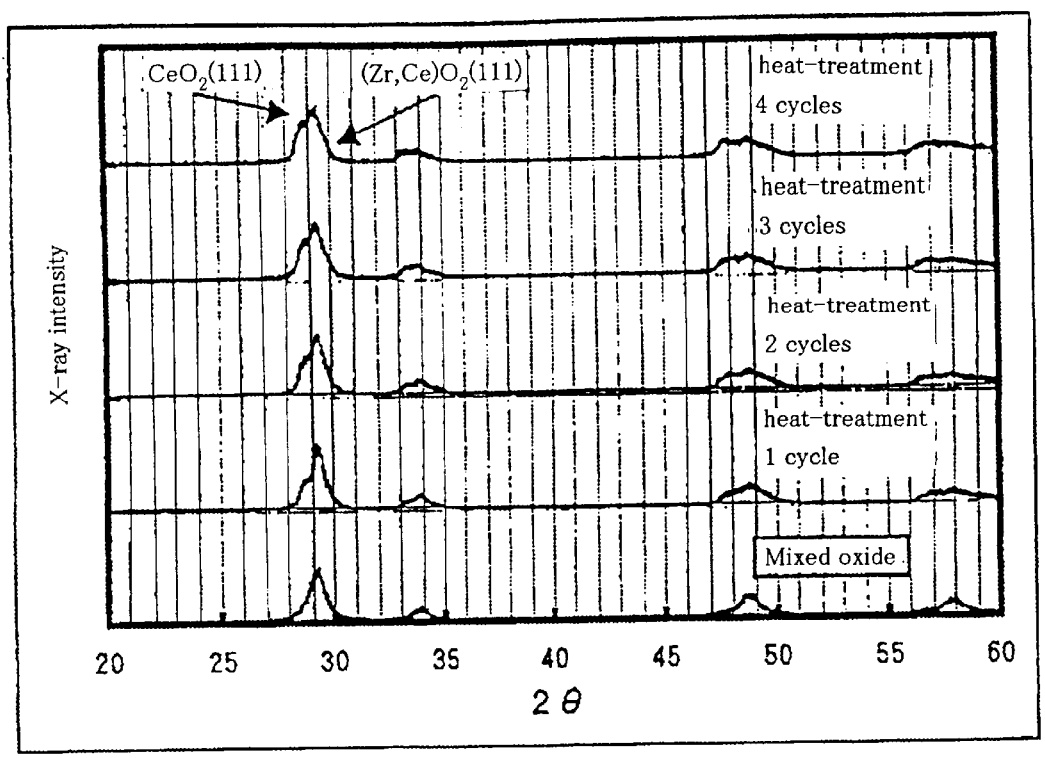
FIG. 3 shows the results of an X ray diffraction analysis of the mixed oxide of Comparative Example 2 before and after heat treatment cycle testing.

The oxides obtained in Example 1, Comparative Example 1 and Comparative Example 2 were subjected to testing by four repeated heating and cooling cycles (heat treatment cycles). After each heating and cooling cycle, each sample was subjected to X ray diffraction analysis. The results thus obtained are shown in FIGS. 1 to 3. After each heating and cooling cycle, each sample was also measured for OSC. The results are shown in FIG. 4.

From FIGS. 1 to 3, it is seen that, with the oxides of Comparative Examples 1 and 2, the intensity of the peak corresponding to the (111) face of ceria increases and the intensity of the peak corresponding to the cubic (111) face of a zirconia- and ceria-based solid solution decreases upon each repetition of the heat treatment cycle. This indicates the progress of sintering of ceria, hence a decrease in catalytic activity. On the contrary, with the mixed oxide of Example 1, it is seen that the cubic phase of a zirconia- and ceria-based solid solution remains predominant even after repeated heat treatment cycles while the formation of pure ceria is prevented; the oxide is thus in a stabilized state.

Figure 4:
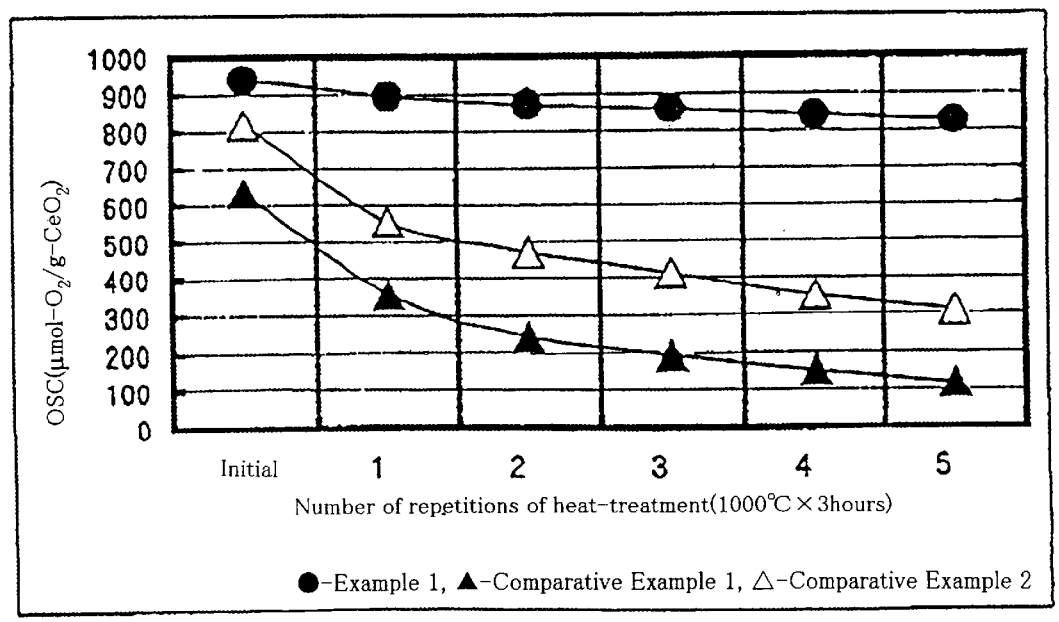
FIG. 4 shows the results of OSC measurement of the mixed oxides of Example 1, Comparative Example 1 and Comparative Example 2 before and after heat treatment cycle testing.

From FIG. 4, it is seen that the oxides of Comparative Examples 1 and 2 show a remarkable decrease in oxygen storage capacity upon repetition of the heat treatment cycle. On the contrary, it is seen that the mixed oxide of Example 1 does not show such a decrease but can exhibit relatively stable performance characteristics.

Test Example 2

Figure 5:
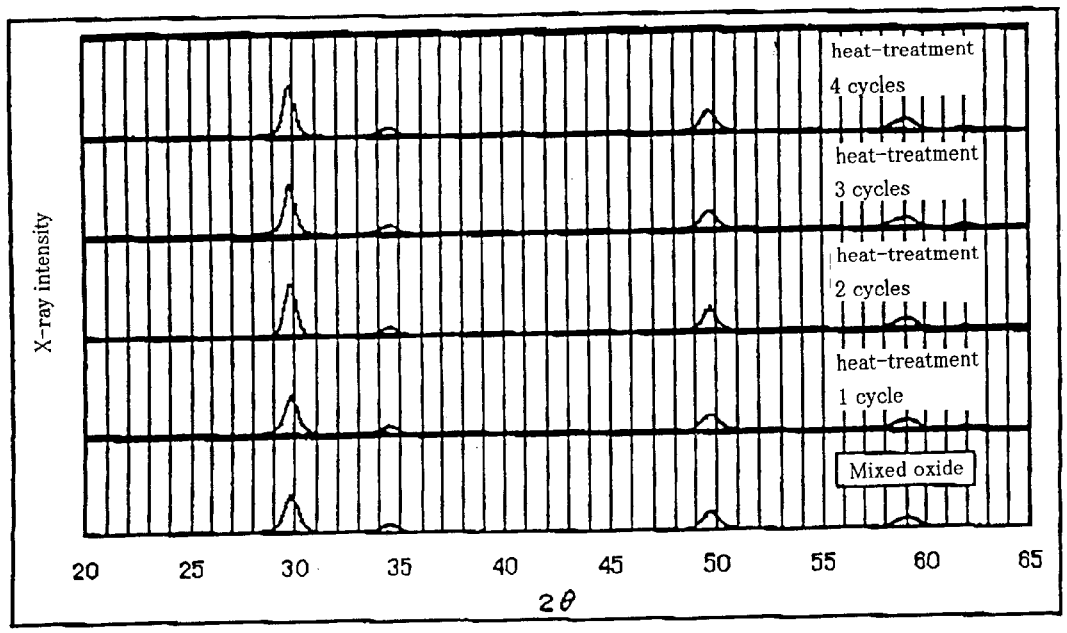
FIG. 5 shows the results of an X ray diffraction analysis of the mixd oxide of Example 5 before and after heat treatment cycle testing.

The mixed oxide obtained in Example 5 was subjected to the same heating and cooling cycle (heat treatment cycle)

test as in Test Example 1. The results are shown in FIG. 5. The mixed oxide was also measured for OSC after each heating and cooling cycle in the same manner as in Test Example 1. The results are shown in FIG. 6.

From FIG. 5, it is seen that, with the mixed oxide of Example 5, a cubic phase of a zirconia- and ceria-based solid solution remains predominant even after repeated heat treatment cycles while the formation of pure ceria is prevented, and the oxide is in a stabilized state.

Figure 6:
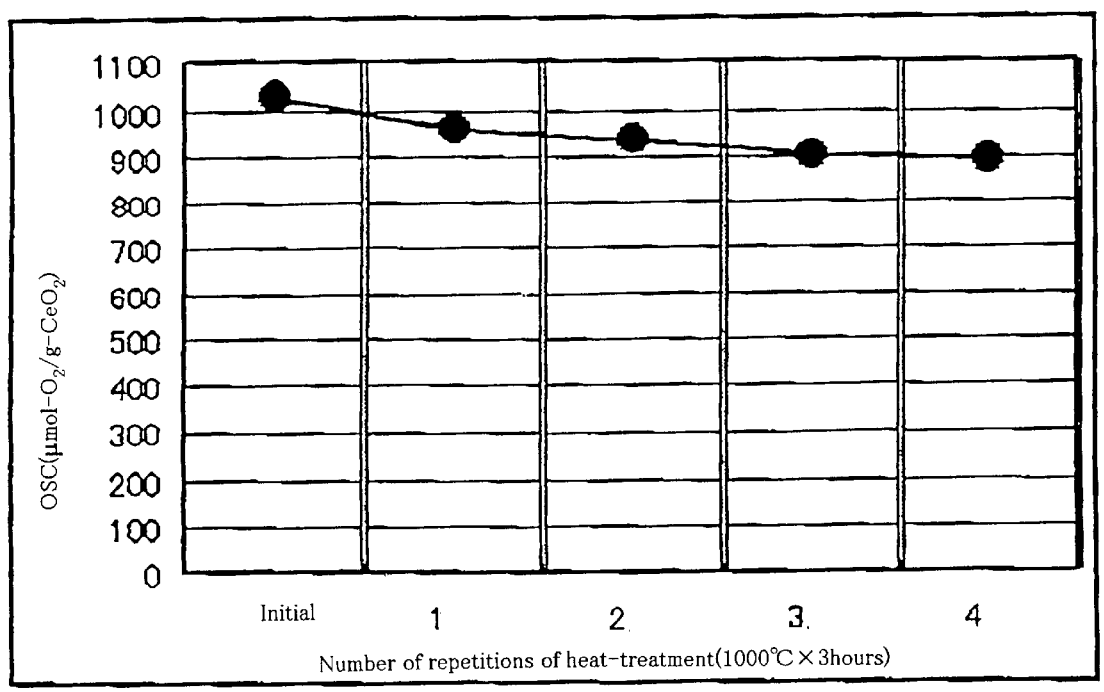
FIG. 6 shows the results of OSC measurement of the mixed oxide of Example 5 before and after heat treatment cycle testing.

From FIG. 6, it is seen that, with the mixed oxide of Example 5, no marked decrease in oxygen storage capacity is not observed and the oxide can show relatively stable performance characteristics.

What is claimed is:

1. A zirconium- and cerium-based mixed oxide comprising zirconium and cerium, characterized in (1) that cubic phase purity of a zirconia- and ceria-based solid solution is not less than 95% by volume of the crystal phase thereof and (2) that the cubic phase purity is not less than 75% by volume even after at least two repetitions of the step of subjecting the mixed oxide to heat treatment at 1,000° C. and then cooling the same to room temperature.

2. A zirconium- and cerium-based mixed oxide comprising zirconium and cerium, characterized in (1) that it has an initial oxygen storage capacity of not less than 800 $\mu$mol $O_2$/g $CeO_2$ and (2) that it has an oxygen storage capacity of not less than 70% of the initial oxygen storage capacity even after at least two repetitions of the step of subjecting the mixed oxide to heat treatment at 1,000° C. and then cooling the same to room temperature.

3. A zirconium- and cerium-based mixed oxide comprising zirconium and cerium as claimed in claim 1, characterized in (1) that it has an initial oxygen storage capacity of not less than 800 $\mu$mol $O_2$/g $CeO_2$ and (2) that it has an oxygen storage capacity of not less than 70% of the initial oxygen storage capacity even after at least two repetitions of the step of subjecting the mixed oxide to heat treatment at 1,000° C. and then cooling the same to room temperature.

4. A zirconium- and cerium-based mixed oxide as claimed in any of claims 1 to 3, wherein the specific surface area of the mixed oxide after heat treatment at 1,100° C. is not less than 10 $m^2$/g.

5. A zirconium- and cerium-based mixed oxide as claimed in any of claims 1 to 3, wherein the percentage composition comprises 30 to 90% by weight of zirconium oxide and 10 to 70% by weight of cerium oxide.

6. A zirconium- and cerium-based mixed oxide as claimed in any of claims 1 to 3 which further comprises at least one member of the class consisting of rare earth metals (excluding cerium), titanium and hafnium.

7. A zirconium- and cerium-based mixed oxide as claimed in any of claims 1 to 3 which further comprises sulfur in an amount not exceeding 3% by weight as sulfate.

8. A method of producing zirconium- and cerium-based mixed oxides which comprises admixing basic zirconium sulfate with a cerium ion-containing solution and then adding a base to the resulting mixed solution to thereby cause formation of a precipitate.

9. A method of production as claimed in claim 8, wherein the mixed solution contains at least one member of the class consisting of rare earth metals (excluding cerium), titanium and hafnium.

* * * * *

UNITED STATES PATENT AND TRADEMARK OFFICE
CERTIFICATE OF CORRECTION

PATENT NO. : 6,255,242 B1
DATED : July 3, 2001
INVENTOR(S) : Unemoto et al.

It is certified that error appears in the above-identified patent and that said Letters Patent is hereby corrected as shown below:

Title page,
Item [57], ABSTRACT,
Line 14, "causing" should read -- cause --

Column 1,
Line 24, "deteriorate" should read -- deteriorates --
Line 33, ". Methods" should read -- and methods --

Column 2,
Line 11, "mixd" should read -- mixed --

Column 9,
Table 1, insert a footnote to Table 1, -- (The values in the table indicate the weights as oxides of respective components) --
Table 2, "oxgen" (three occurrences) should read -- oxygen --; and "Oxgen" should read -- Oxygen --

Column 10,
Table 3, "oxgen" (three occurrences) should read -- oxygen --; and "Oxgen" should read -- Oxygen --

Signed and Sealed this

Twelfth Day of March, 2002

JAMES E. ROGAN
Director of the United States Patent and Trademark Office